United States Patent
Peterson

(10) Patent No.: US 7,571,563 B2
(45) Date of Patent: Aug. 11, 2009

(54) FLEXIBLE SUPPORTS FOR RIFLES, SPOTTING SCOPES, AND THE LIKE

(75) Inventor: Thomas K. M. Peterson, New Ulm, MN (US)

(73) Assignee: Bushnell Inc., Overland Park, KS (US)

( * ) Notice: Subject to any disclaimer, the term of this patent is extended or adjusted under 35 U.S.C. 154(b) by 541 days.

(21) Appl. No.: 11/276,020

(22) Filed: Feb. 9, 2006

(65) Prior Publication Data

US 2007/0079541 A1 Apr. 12, 2007

Related U.S. Application Data

(63) Continuation-in-part of application No. 11/245,953, filed on Oct. 6, 2005, now abandoned.

(51) Int. Cl.
*F41C 27/22* (2006.01)
*F16M 11/12* (2006.01)

(52) U.S. Cl. .......................... 42/94; 89/40.06; 248/165

(58) Field of Classification Search .............. 42/94; 248/163.1, 371, 372.1, 165; 89/40.06
See application file for complete search history.

(56) References Cited

U.S. PATENT DOCUMENTS

| | | | | |
|---|---|---|---|---|
| 335,823 | A * | 2/1886 | Von Der Linden | 248/165 |
| 1,295,688 | A * | 2/1919 | Butler | 42/94 |
| 1,382,409 | A * | 6/1921 | Butler | 42/94 |
| 1,496,465 | A * | 6/1924 | Jackson | 248/165 |
| 3,235,997 | A * | 2/1966 | Stoner | 42/94 |
| 3,632,073 | A * | 1/1972 | Nakatani | 248/169 |
| 4,580,483 | A * | 4/1986 | Garbini | 89/40.06 |
| 5,074,188 | A | 12/1991 | Harris | |
| 5,194,678 | A | 3/1993 | Kramer | |
| 5,345,706 | A | 9/1994 | Brown | |
| 5,507,111 | A * | 4/1996 | Stinson et al. | 42/94 |
| 5,815,974 | A | 10/1998 | Keng | |
| 5,930,932 | A * | 8/1999 | Peterson | 42/94 |
| 6,042,080 | A * | 3/2000 | Shepherd et al. | 248/683 |
| 6,289,622 | B1 | 9/2001 | Desch, Jr. et al. | |
| 6,296,213 | B1 * | 10/2001 | Law et al. | 248/166 |
| 6,517,133 | B2 | 2/2003 | Seegmiller et al. | |
| 6,663,071 | B2 | 12/2003 | Peterson | |
| 6,763,627 | B1 | 7/2004 | Kaempe | |
| 6,843,015 | B2 | 1/2005 | Sharp | |
| 7,421,815 | B1 * | 9/2008 | Moody et al. | 42/72 |
| 2005/0151035 | A1 * | 7/2005 | Crain et al. | 248/163.1 |
| 2005/0188597 | A1 | 9/2005 | Keng et al. | |

* cited by examiner

*Primary Examiner*—Bret Hayes
(74) *Attorney, Agent, or Firm*—Hovey Williams LLP

(57) ABSTRACT

A flexible yoke or mounting body for a pod support apparatus, such as a monopod or bipod, includes a resilient section interposed between leg(s) of the pod support and a device supported thereon. The resilient section is preferably formed of a bendable elastomeric material to thereby facilitate manual tilting of the portable equipment on the pod support apparatus. In a multipod embodiment, the yoke or mounting body may include multiple leg extensions of elastomeric material for detachably securing multiple support legs thereto in angularly-spaced relation. The resilient section may allow the legs of a multipod to be moved independently of each other. A quick-detachable coupling device is preferably provided for detachably and rotatably coupling a piece of portable equipment such as a rifle or spotting scope to the pod support device.

11 Claims, 4 Drawing Sheets

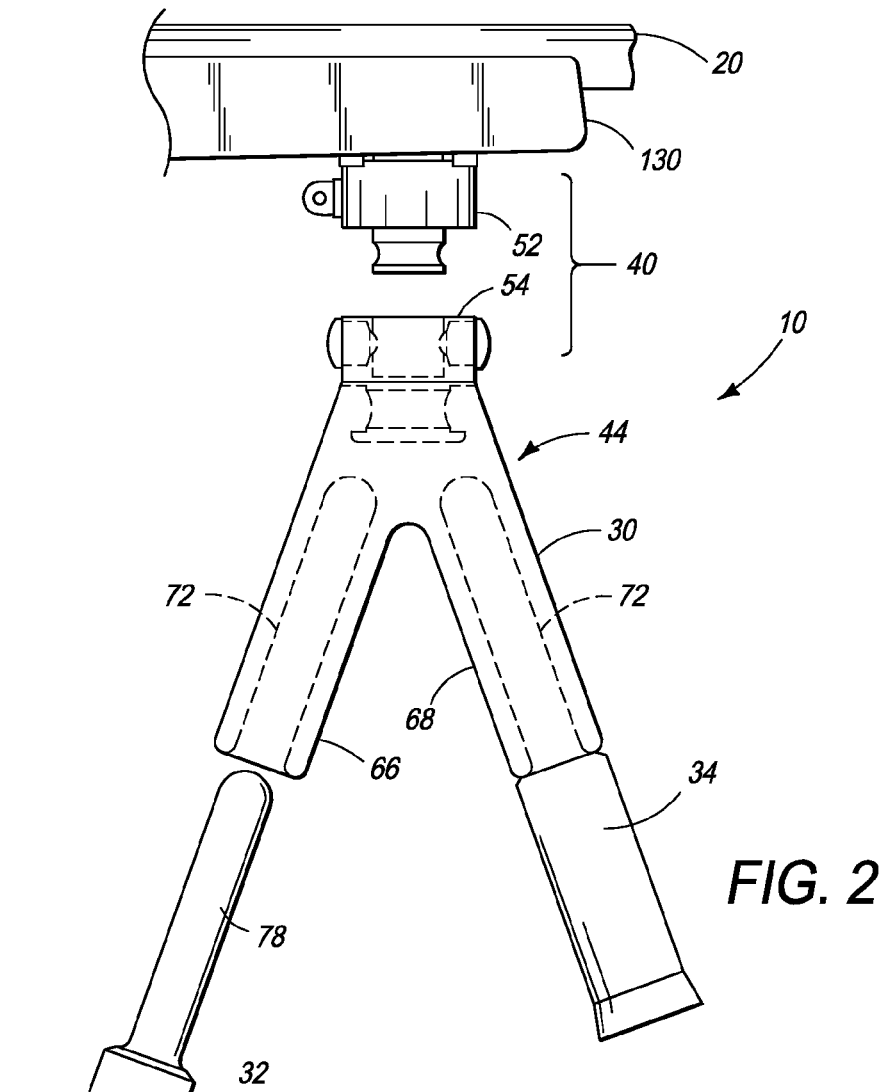
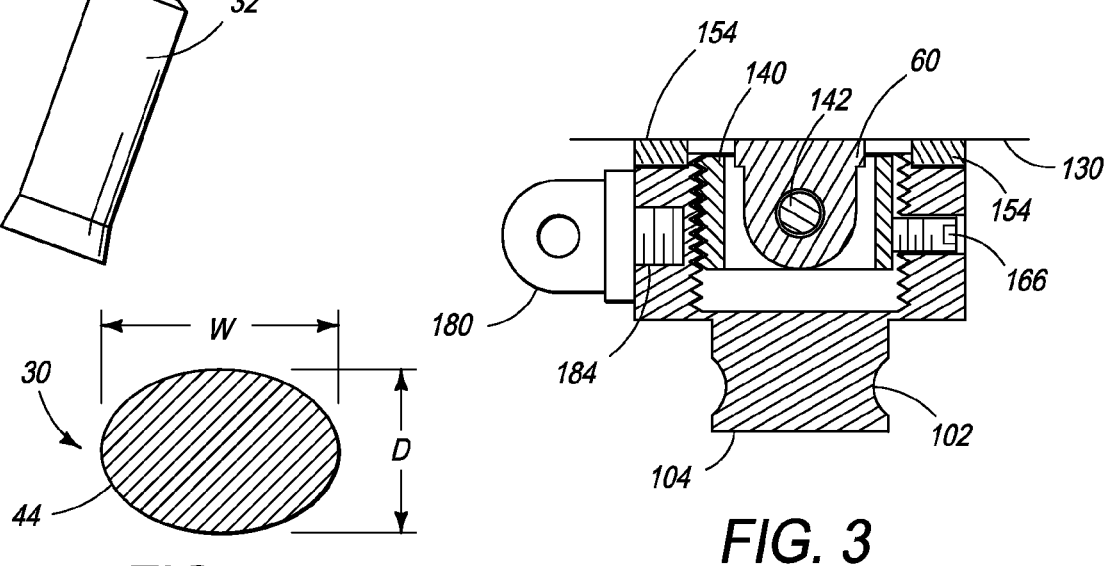

FLEXIBLE SUPPORTS FOR RIFLES, SPOTTING SCOPES, AND THE LIKE

RELATED APPLICATION

This is a continuation-in-part of U.S. application Ser. No. 11/245,953, filed Oct. 6, 2005, which is incorporated herein by reference.

TECHNICAL FIELD

This application relates to monopods, bipods, and multipod support devices for supporting rifles, spotting scopes, and the like.

BACKGROUND OF THE INVENTION

Monopods and bipods are known for use with rifles and other light arms for supporting a portion of the weight of the rifle on a support surface to improve aiming and reduce fatigue. They are also sometimes used to support other aimed devices, such as spotting scopes and cameras, for example. Bipods specially designed for use with rifles and other long guns typically attach directly to the gun barrel or to a forend (forward part) of the gun stock. Some known firearm bipods include legs that pivot together for storage. Many bipods for rifles include relatively complicated mechanical pivot and adjustment mechanisms and are heavy and expensive to manufacture. In addition to increasing a user's load-carrying burden, the weight of a heavy bipod is also believed to impair the aim and/or accuracy of the firearm to which it is mounted. Many other issues relating to various known bipod designs are described in or evident from prior patents.

U.S. Pat. No. 6,289,622 of Desch, Jr. describes an integrated firearm stock and support system including a pair of pivoting and telescoping bipod legs that are retractable into a slot in the underside of the forend of the stock for storage. This convenient bipod is relatively lightweight and compact, but requires the gun to be retrofitted or custom made with the special stock.

U.S. Pat. No. 6,843,015 of Sharp describes a bipod and mount featuring a ball-in-socket joint between the bipod and the firearm. In one embodiment, the ball attachment of the ball-and-socket joint is attached to the firearm via a sling swivel stud commonly found along the underside of the forend of the stock on most rifles. In this embodiment, the ball attachment also includes an auxiliary sling swivel stud that extends aft of where the ball attachment attaches to the firearm. The socket is formed in a split body of the bipod, which is made of two pieces of ultra-high molecular weight polyethylene to facilitate a detachable snap-fit between the ball and socket. The legs of the Sharp '015 bipod are rotatably connected to the body so that they can be folded together for storage and transport.

U.S. Pat. No. 5,074,188 of Harris describes a bipod adapter including an elongate rubber hinge-like member that extends longitudinally along the underside of the barrel between a base member attached to the forend of the firearm stock and a bipod mounting member to which a bipod is coupled. The rubber hinge member is strong enough to support the firearm in the normal position, but yieldable to allow the firearm to be manually pivoted to either side relative to the bipod when resting the bipod's legs on an uneven surface.

U.S. Pat. No. 6,663,071 of Peterson describes a hiking staff including a threaded stud that extends from its upper end for attaching an inverted-V-shaped monopod head thereto. Peterson '071 also describes the use of two such hiking staffs with an articulating head to form an adjustable bipod rest for guns, binoculars, cameras, and the like. These bipod and monopod devices are readily disassembled and feature multi-use components. However they lack a coupling for attaching the monopod or bipod to a firearm.

The present inventor has recognized a need for improved monopod and multipod support devices.

SUMMARY

In one embodiment, a bipod for supporting a piece of aimed portable equipment such as a rifle or spotting scope comprises a pair of legs coupled together by a yoke having a resilient section interposed between the legs and the portable equipment supported thereon. The resilient section is preferably formed of an elastomeric material and sized to allow the portable equipment to be manually tilted forward, rearward, and to either side relative to the legs.

In a simplified embodiment, an elongate flexible mounting body having opposing first and second ends is firmly attached via its first end to a proximal end of a monopod support leg. A detachable coupling device is provided for detachably securing a piece of aimed portable equipment to the second end of the mounting body. The coupling device preferably allows the portable equipment to remain rotatable relative to the mounting body when coupled thereto. The mounting body has a resilient neck section interposed between the portable equipment and the support leg, which is formed of an elastomeric material that is sufficiently flexible so as to allow the portable equipment to be manually tilted in various directions relative to the support leg. In some embodiments, multiple support legs are attached to and diverge from the mounting body to form a multipod support apparatus.

Also disclosed is a flexible yoke for a multipod support apparatus. In a preferred embodiment, the yoke comprises a neck section and multiple spaced apart leg extensions depending therefrom. The leg extensions are adapted for securing multiple support legs thereto in angularly-spaced relation. A quick-detachable coupling device is preferably secured to the neck section opposite the leg extensions for detachably coupling the yoke to a piece of portable equipment. Preferably at least one of the neck section and the leg extensions is formed of an elastomeric material to thereby facilitate manual tilting of a piece of portable equipment supported on the multipod support apparatus.

Additional aspects and advantages will be apparent from the following detailed description of preferred embodiments, which proceeds with reference to the accompanying drawings.

BRIEF DESCRIPTION OF THE DRAWINGS

FIG. 2 is an enlarged side view of the bipod of FIG. 1, partly disassembled to show detail of a quick-detachable coupling and removable legs;

FIG. 3 is a cross section view of a male part of the quick-detachable coupling of FIG. 2 and hardware that attaches the male part to a swivel stud of the rifle;

FIG. 5 is a cross section view of a bipod yoke of FIG. 4, taken along lines 5-5.

DETAILED DESCRIPTION OF PREFERRED EMBODIMENTS

Figure 1:
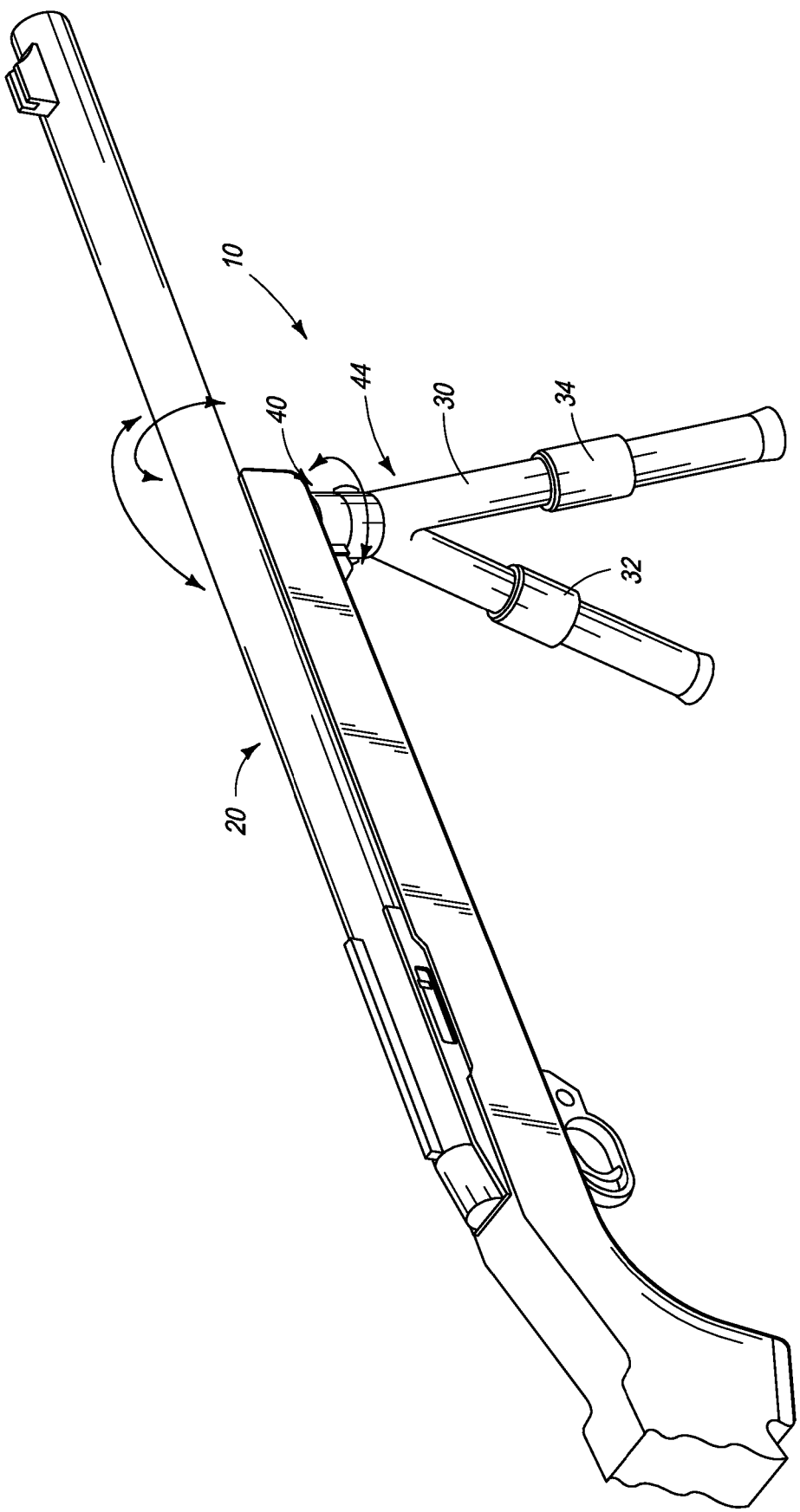
FIG. 1 is a pictorial view of a bipod in accordance with a first embodiment, attached to and supporting a rifle.

FIG. 1 shows a bipod 10 according to a first embodiment supporting a rifle 20 on a support surface. With reference to FIG. 1, bipod 10 includes a yoke 30 that couples together a pair of downwardly depending legs 32 and 34 of bipod 10 in angularly-spaced relation. A coupling device 40 attached to yoke 30 adjacent a neck section 44 thereof and opposite legs 32 and 34 couples bipod 10 to rifle 20. Although the preferred embodiments are shown in the drawings supporting a rifle, these and other embodiments of bipod 10 and other support apparatuses described herein may be used to support various other kinds of portable equipment, and may be particularly useful with portable equipment that it is necessary to aim at a target, such as shotguns, handguns, crossbows, and other light projectile-launching weapons, cameras, binoculars, telescopes, spotting scopes, and video cameras, for example.

FIG. 2 is an enlarged elevation view of rifle 20 and bipod 10, partly disassembled to show detail of coupling device 40. In the embodiment shown, coupling mechanism 40 includes quick-detachable coupling mechanism including male and female parts 52 and 54 that may be coupled and decoupled by merely inserting a male plug portion 104 (FIGS. 3-4) of male part 52 into a socket bore 110 (FIG. 4) of female part 54, and thereafter decoupled by manually pulling apart male and female parts 52, 54 along their axis of engagement 94. In an alternative embodiment (not shown), coupling device 40 may include a locking or latching mechanism to help prevent bipod 10 from being inadvertently detached from rifle 20. In still other embodiments not shown in the drawings, coupling device 40 may include another kind of coupling or fastener, such as a threaded fastener. Yoke 30 may also be permanently attached to a rifle or other portable device (not shown).

Figure 4:
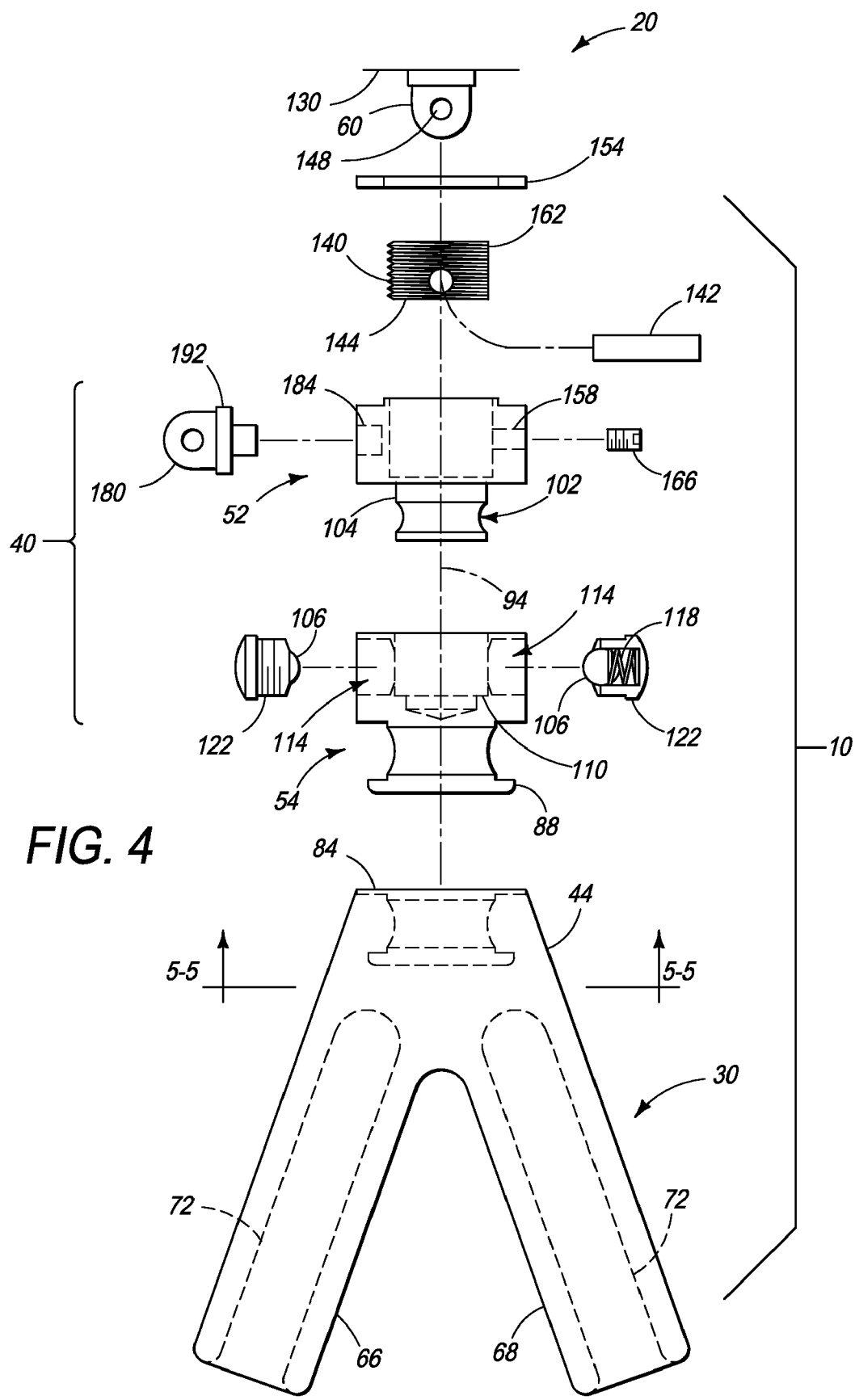
FIG. 4 is an exploded assembly view of the bipod of FIG. 2.

FIG. 4 is an enlarged exploded assembly view of bipod 10 and a swivel stud 60 of rifle 20, but omitting legs 32 and 34 of bipod 10. With reference to FIGS. 2 and 4, yoke 30 includes spaced-apart first and second leg extensions 66 and 68, which depend from neck section 44 and diverge therefrom with an angular spacing therebetween of approximately 40° (although substantially smaller or larger angular spacings may also be used). Leg extensions 66 and 68 are coupled to legs 32 and 34, respectively, via a downwardly opening socket 72 in each of the leg extensions 66, 68. The sockets 72 are sized to fit a cylindrical pin 78 (FIG. 2) projecting from the end of each of the legs 32 and 34 in a manually insertable and removable press fit. The fit between sockets 72 and pins 78, allows legs 32, 34 to be conveniently assembled and disassembled from yoke 30 in the field. Alternatively, legs 32, 34 may be attachable to yoke 30 via another kind of connector, such as a threaded stud or quick connect (not shown). In the embodiment shown, leg extensions 66 and 68 and sockets 72 extend for a majority of the overall length of yoke 30. However, in alternative embodiments, leg extensions 66 and 68 may be much shorter than shown or even of essentially no length relative to other parts of yoke 30.

Although bipod 10 includes two legs, other support apparatuses according to alternative embodiments may have only one leg (a monopod), or more than two legs, such as 3, 4 or 5 legs. Multipods (having two or more legs) and monopods (having only one leg) provide different degrees of portability, stability, and ease of use, and some configurations may be more suitable for end uses than others.

In the embodiments illustrated, legs 32, 34 are only a few inches in length, for supporting rifle 20 at a height suitable for shooting from a prone position. However, in other embodiments, legs 32, 34 may be significantly longer in length, i.e., as much as several feet long, for use from a standing position. Different lengths or styles of legs 32, 34 may be selectively interchangeably coupled to yoke 30, provided that all of the styles have pins 78 sized to fit within sockets 72. Thus, a single yoke may be utilized with any of multiple sets of legs, including, for example, a first set of legs having a short length for shooting from a prone position, a second set of legs of medium length for shooting from a sitting or kneeling position, and a third set of legs of long length for shooting from a standing position. Legs 32, 34 may comprise one or more segments of rigid tubing, and preferably segments of tubing formed of aluminum or another metal and arranged in a telescoping manner for adjustable length, such as described in U.S. Pat. Nos. 6,027,087 and 6,663,071, both of Peterson, which are incorporated herein by reference. Pins 78 may also be formed of a metal, such as aluminum, or of another relatively rigid material, such as an injected molded thermoplastic. Pins 78 may be press-fit into tubing of legs 32, 34, formed integrally therewith, or otherwise fastened thereto.

Yoke 30 preferably includes at least one resilient section interposed between rifle 20 and legs 32 and 34, which is formed of a bendable resilient material such as an elastomer. The bendable resilient section allows rifle 20 or other portable equipment supported by bipod 10 to be tilted manually in one or more directions, while providing restorative force for returning the supported equipment to its original or resting position (or nearly thereto). In a preferred embodiment, the resilient section has a shape and physical characteristics that allow the supported equipment to be tilted substantially forward, rearward, and to either side relative to the legs, as shown by the arrows in FIG. 1 above rifle 20. For example, resilient section may allow the supported equipment to be tilted merely a few degrees from its resting position, up to 90° or more from its resting position, or any amount in between. The amount of flexibility in any particular direction is a function of the shape of the resilient section and the material from which it is made.

FIG. 5 illustrates a horizontal cross sectional shape of neck 44 taken along line 5-5 of FIG. 4. With reference to FIG. 5, the horizontal cross section may preferably have a width W of approximately 1.25 inch and a depth D of approximately 0.875 inch, for an aspect ratio of approximately 10:7 (1.43:1). In other embodiments, width W and depth D of the horizontal cross section of the resilient section may range from between approximately 0.5 inch to approximately 3 inches and have an aspect ratio of up to 3:1, but may more preferably be less than 1.5 inch in width and depth, with an aspect ratio of less than 2:1. Consistent with an expected usage of bipod with rifles, the oval cross section of neck 44 may allow rifle 20 to be more easily tilted in the forward and rearward directions than to the sides. In other embodiments, the support device and particularly the resilient section may be symmetric and/or of a circular cross section, as in the monopod support device 200 of FIG. 6, for example. In still other embodiments (not shown), the resilient section may have a cross section of another shape altogether, such as rectangular, trapezoidal, or triangular, for example.

Resilient neck 44 may be sufficiently resilient in the rearward direction to allow the legs 32, 34 to be quickly folded back and held against the stock 130 of the rifle 20 for portability without detaching the legs 32, 34 or yoke 30 from rifle 20. To redeploy legs 32, 34, they need merely be released, whereupon the resiliency of yoke 30 causes legs 32, 34 to swing back to their original position.

Resilient section may comprise any portion or all of neck section 44, first leg extension 66, second leg extension 68, and other portions or parts of yoke 30. For example, the resilient section may comprise the region of neck section 44 between female part 54 and the terminus of sockets 72, where yoke may be relatively freely bent, uninhibited by rigid metal pins 78 or female part 54. In other embodiments, more than one resilient section may exist to provide more than one region where bending may occur. The resilient section preferably includes a zone of resiliency interposed between legs 32, 34 to allow the legs to be moved independently of each other. For example, bipod 10 may be easily adjusted for leveling rifle 20 on uneven terrain merely by moving the legs 32, 34 to adjust the relative angular positions thereof. In this manner, the feet of the legs 32, 34 can be moved laterally, forward, or rearward to desired locations on a support surface. The feet of the legs 32, 34 may be moved several inches or several feet from their resting positions depending on the length of the legs 32, 34. This allows a stable support platform to be quickly and easily established without need to operate complicated mechanical adjustment mechanisms. In one embodiment, the zone of resiliency may take the form of a web of resilient material between leg extensions 66, 68. The zone of resiliency may also comprise a pair of resilient sections, each interposed between one of the leg extensions 66, 68 and rifle 20.

Bending regions of the resilient section, including multiple bending regions in combination, may result in flexibility characteristics of yoke 30 which are dependent on the direction in which yoke is being flexed. Flexibility characteristics may also be made asymmetric by design. A flexible resilient section facilitates aiming of a piece of portable equipment such as rifle 20 and may also prevent negative effects on the aim or accuracy of a firearm that can otherwise be induced by heavy prior-art bipod support devices which are inflexible the direction of recoil.

Preferably, yoke 30 and legs 66 and 68 are molded of one piece construction of a thermoplastic elastomer such as a styrenic block copolymer, fluorosilicone rubber, EPDM, polyurethane, SANTOPRENE™, or blends thereof, for example. The material type, durometer, and elasticity of the elastomer may be selected based on the load expected to be supported by bipod 10. For example, in a preferred embodiment for light arms including hunting rifles, yoke 30 may be formed of a thermoplastic elastomer having a nominal durometer of approximately 80-90 Shore A, tensile strength of approximately 1200 pounds per square inch (psi), tensile elongation of approximately 1100.0%, and tear strength of approximately 160.0 pounds per linear inch (pli). Another important consideration in the selection of a suitable elastomer material is the range of temperature conditions in which the device will be used. Outdoor enthusiasts and hunters utilize multipod support devices in conditions ranging from summer heat in excess of 115° F. to arctic winters where temperatures may dip well below −20° F. Thus, the elastomer should be selected to retain a substantial amount of strength, flexibility, and elasticity throughout a relatively wide range of temperatures. One such suitable material is a blend of 85% by weight of a styrenic block copolymer thermoplastic elastomer (SBC/TES) such as the formulation sold by RTP Company of Winona, Minn., USA under product No. RTP 2799 Ex 109692, mixed with 15% by weight of a polypropylene homopolymer sold by Basell North America, Inc. of Elkton, Md., USA under the product name Pro-fax™ 6323. This special blend may be capable of performing in temperatures ranging between −90° F. and 210° F. without substantial degradation in its strength, flexibility, and elasticity, for example.

For a secure connection between an upper end 84 of yoke adjacent neck section 44 and female part 54 of coupling device 40, yoke 30 may be molded around female part 54 utilizing an insert molding process. Female part 54 may include anchoring features such as a flange 88 to engage portions of yoke 30 which are overmolded around or onto the features. Alternatively, female part 54 may be bonded with or otherwise fastened to yoke. In another embodiment (not shown), the socket and detent features of female part 54 described below may be formed or molded directly into yoke 30, or into a molded or formed insert, rather than the machined and assembled metal parts of female part 54. In still other embodiments, the female and male parts of coupling device 40 may be reversed, so that male part 52 is anchored to yoke 30 and female part 54 is attached to the rifle 20 or other portable equipment.

FIG. 3 is an enlarged cross-section view of male part 52 of coupling device 40 and attachment hardware for mounting male part 52 to rifle 20 or another piece of portable equipment. With reference to FIGS. 3 and 4, male and female parts 52, 54 may be releasably retained together by a detent mechanism including a circumferential groove 102 formed around a plug portion 104 of male part 52 that is engaged by detent balls 106 which are urged inwardly into a bore 110 of female part 54 through a pair of opposing lateral holes 114. The detent balls 106 are urged inwardly by detent springs 118 captured and compressed by detent plugs 122, which are threaded into lateral holes 114.

The connection provided by coupling device 40 is preferably freely rotatable about a vertical axis 94 to readily facilitate horizontal (yaw) adjustments to the aim of rifle 10 relative to legs 32, 34, as indicated by arrows in FIG. 1 near coupling device 40. At the same time, detent mechanism is preferably strong enough to support the weight of bipod 10 without releasing, so that bipod 10 is readily repositioned with rifle 20 when rifle 20 is lifted and moved. The detent mechanism and other male/female coupling mechanisms that couple together along vertical axis 94 resist transverse forces and will not detach during recoil of a firearm, yet are easy to nearly silently couple and decouple with one hand and without looking at the coupling. This may make it possible for a hunter to attach and detach bipod 10 without needing to lose sight of prey or frightening it away. Male and female parts 52, 54 are preferably made of a metal such as steel or aluminum for durability and strength, and may be anodized or painted to reduce surface reflectivity and aesthetic appearance. In other embodiments, male and female parts 52, 54 may be made of other materials, such as high strength plastic materials.

Male and female parts 52, 54 are interchangeable with like parts mounted to other guns and yokes. This interchangeability allows bipod 10 to be quickly removed from rifle 20 and re-attached to a different gun on which another like male part is mounted. The interchangeability of male and female parts 52, 54 also enables a user to quickly detach rifle 20 from one bipod 10 and reattach it to another bipod or other support device or accessory on which another like female part is mounted.

The detent mechanism of coupling device 40 may also be achieved through structures or elements other than those described above, such as a molded detent ridge in a resilient socket or plug member, for example. In some embodiments, a readily detachable retention can be achieved through another quick-detachable coupling mechanism, such as one of the coupling mechanisms described by U.S. Pat. No. 4,663, 796 of Helling; U.S Pat. No. 6,152,645 of Sanford; and U.S. Pat. No. 6,511,100 of Le Clinche, for example. In other embodiments, releasable retention may be achieved through means other than a detent mechanism, such as a latching mechanism, snap ring, or other device. The term quick-detachable coupling device, thus, refers to all manner of mechanical coupling devices that do not require tools for coupling or decoupling, are not threaded, are possible to securely join with one hand, and do not require multiple complicated maneuvers to detach (i.e., a single hand motion or simple series of two or three hand motions is sufficient).

Figure 6:
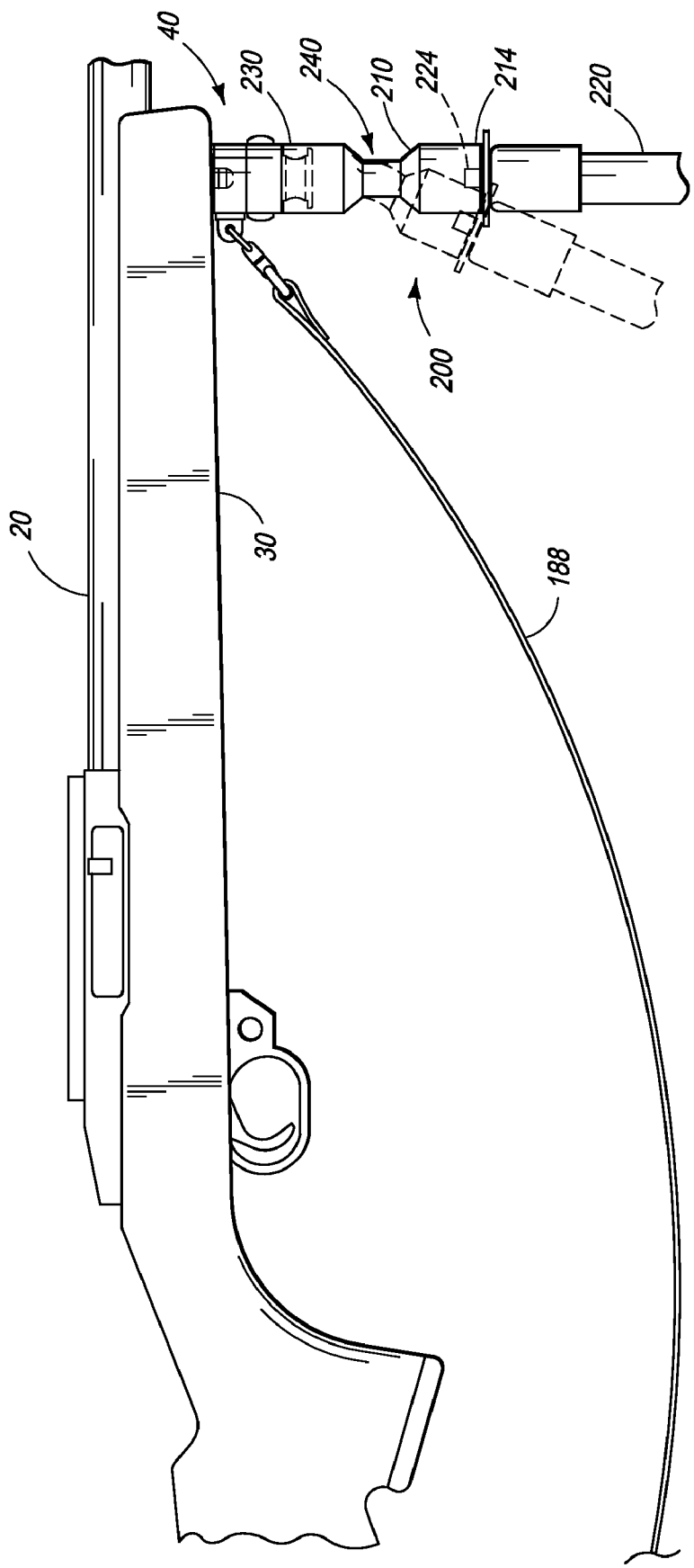
FIG. 6 is a side elevation view of a monopod support apparatus according to a second embodiment, attached to and supporting a rifle.

In the embodiment shown, male part 52 is attached to the underside of a forend of stock 130, preferably via a swivel stud 60 preinstalled on most hunting rifles. To securely attach male part 52 to stock 130, a threaded sleeve 140 is positioned over swivel stud 60. A retaining pin extends through a cross bore 144 extending through sleeve 140 and an eyelet 148 of stud 60, to restrict rotation of threaded sleeve 140 and to align a flat 162 of sleeve toward the muzzle end of rifle 20. Male part 52 is then threaded onto threaded sleeve 140, with a soft take-up washer 154 positioned between male part 52 and stock 130 to prevent marring of stock 130 and to prevent moisture and debris from collecting behind male part 52. A threaded set screw hole 158 cross-drilled into male part 52 is aligned with the barrel of rifle 20 so that a set screw 166 can be threaded therein and tightened against flat 162 to prevent male part 52 from coming unthreaded from threaded sleeve 140. An auxiliary swivel stud 180 is preferably threaded into a swivel stud hole 184 in male part 52 opposite set screw hole 158 to provide a base to which a sling 188 can be attached (FIG. 6). A plastic swivel washer 192 allows swivel screw 180 to be snugly tightened to a point where its eyelet is positioned horizontally to receive a sling swivel of sling 188.

FIG. 6 shows a single-leg support device or monopod 200 according to another embodiment. With reference to FIG. 6, monopod 200 includes an elongate mounting body 210 having a first end 214 supported on and coupled to a proximal end of a support leg 220, such as a telescoping hiking staff of the kind described in U.S. Pat. No. 6,663,017 or any other support leg. A threaded mounting stud 224 extending from the proximal end of support leg 220 provides a fastener for mating with a threaded insert (not shown) in mounting body 210. A coupling device such as one of those described herein with reference to FIGS. 1-4 or another quick-detachable coupling device preferably detachably rotatably secures a second end 230 of mounting body 210 opposite first end 214 to a rifle 20 or other piece of portable equipment.

Mounting body includes a resilient neck section 240 interposed between rifle 20 and support leg 220 which is formed of an elastomeric material that is sufficiently flexible so as to allow the portable equipment to be manually tilted in any direction relative to the support leg 220, including forwardly, rearwardly, and to either side. Suitable elastomeric materials are listed above with reference to yoke 30 of FIGS. 1-5. Neck section 240 of mounting body 210 is preferably circular in its horizontal cross section so that the rotational orientation of mounting body 210 has no effect on the maneuverability of the portable equipment, although other cross sections may also be used. Neck section 240 may include a necked bending region having a horizontal cross section with an aspect ratio of less than 2:1. In other embodiments, mounting body 210 may include a plurality of feet or leg extensions with a fastening device such as a threaded insert, for attaching multiple support legs to complete a bipod or multipod support device.

It will be obvious to those having skill in the art that many changes may be made to the details of the above-described embodiments without departing from the underlying principles of the invention. The scope of the present invention should, therefore, be determined only by the following claims.

The invention claimed is:

1. A bipod for supporting a piece of aimed portable equipment, comprising:
   a pair of legs; and
   a yoke coupling the legs together and to the portable equipment, the yoke having
      a resilient section interposed between the portable equipment and the legs, the resilient section being formed of an elastomeric material and sized to allow the portable equipment to be manually tilted forward, rearward, and to either side relative to the legs, and
      a neck section and a pair of spaced apart leg extensions depending from the neck section, such that the legs are attached at a proximal end thereof to the leg extensions, and the leg extensions are formed of an elastomeric material, wherein each of the leg extensions includes a downwardly-opening socket and each of the leg extensions is removably press fit into the socket.

2. The bipod of claim 1 in which at least a portion of the resilient section is interposed between the legs to allow the legs to be moved independently of each other.

3. The bipod of claim 1 in which the legs are detachably coupled to the yoke.

4. The bipod of claim 1 further comprising a detachable coupling mechanism that releasably couples the yoke to the portable equipment.

5. The bipod of claim 4 in which the yoke is molded to at least a part of the detachable coupling mechanism.

6. The bipod of claim 4 in which the detachable coupling mechanism includes a first mating part and a second mating part, the first part including a detent and the second part including a detent groove that engages the detent.

7. The bipod of claim 1 further comprising a rotatable coupling device for coupling the yoke to the portable equipment, the coupling device allowing the portable equipment to rotate freely relative to the legs about a generally vertical axis.

8. The bipod of claim 7 in which the coupling device is detachable.

9. The bipod of claim 1 in which each of the legs includes multiple telescoping leg sections for manual adjustment of the length of the legs.

10. The bipod of claim 1, in which the neck section includes a bending region, the bending region having a horizontal cross section with an aspect ratio of less than 2:1.

11. The bipod of claim 10, in which the horizontal cross section of the bending region is circular.

* * * * *